US006219077B1

(12) United States Patent
Suzuki

(10) Patent No.: US 6,219,077 B1
(45) Date of Patent: *Apr. 17, 2001

(54) PRINTER SYSTEM

(75) Inventor: Minoru Suzuki, Tochigi (JP)

(73) Assignee: Asahi Kogaku Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/174,554

(22) Filed: Oct. 19, 1998

(30) Foreign Application Priority Data

Oct. 20, 1997 (JP) .................................................. 9-304989

(51) Int. Cl.[7] ..................................................... G01D 15/16

(52) U.S. Cl. .......................... 347/171; 347/222; 347/172; 400/693.1; 400/692

(58) Field of Search .................................... 347/171, 172, 347/221, 217, 222, 214, 152; 400/120.01, 691, 692, 693, 323

(56) References Cited

U.S. PATENT DOCUMENTS 4,561,789 12/1985 Saito .................................... 347/102
4,731,621 * 3/1988 Hayamizu et al. .................. 347/197
5,164,744 * 11/1992 Yoshida et al. ...................... 347/217
5,208,612 * 5/1993 Obu et al. ............................ 347/152
5,481,280 1/1996 Lam et al. ............................ 347/66

FOREIGN PATENT DOCUMENTS

0092871 * 5/1985 (JP) ................................. B41J/3/20
1-051967 2/1989 (JP) .

* cited by examiner

*Primary Examiner*—N. Le
*Assistant Examiner*—K. Feggins
(74) *Attorney, Agent, or Firm*—Greenblum & Bernstein, P.L.C.

(57) ABSTRACT

A printer system comprises a thermal printer, an ink transfer unit and a thermal printing unit. The ink transfer unit and the thermal printing unit can be selectively mounted in the thermal printer. The ink transfer unit has an ink reservoir in which liquid ink is stored. The thermal printing unit has an ink ribbon. When neither the ink transfer unit nor the thermal printing unit is mounted on the thermal printer, an image can be formed on a thermal recording sheet only by the thermal printer. When the ink transfer unit is mounted on the thermal printer, ink stored in the ink reservoir is transferred onto a recording sheet to form an image thereon. When the thermal printing unit is mounted on the thermal printer, ink contained in the ink ribbon is transferred onto the recording sheet.

11 Claims, 6 Drawing Sheets

PRINTER SYSTEM

BACKGROUND OF THE INVENTION

1. Field of the Invention

The present invention relates to a printer in which an image is formed or printed on a recording sheet using a thermal head.

2. Description of the Related Art

Conventionally, several types of printers, using a thermal head to form an image on a recording sheet, are known. One of them is a printer incorporating a thermal head to directly heat a thermal recording sheet, which is a heat sensitive color-developing sheet. The other is a printer in which an ink ribbon is heated so that molten ink is transferred onto a recording sheet.

Thus, the conventional printers are not suitably constructed to enable selective, interchangeable use of the materials, which include the thermal recording sheet, the ink ribbon and liquid ink, to suit a given situation.

SUMMARY OF THE INVENTION

Therefore, an object of the present invention is to provide a printer system in which the thermal recording sheet, the ink ribbon and the liquid ink, can be selectively used.

According to the present invention, there is provided a printer system comprising a thermal printer, an ink transfer unit and a thermal printing unit. The thermal printer includes a thermal head and a platen roller facing each other to define a recording sheet passage therebetween. The ink transfer unit includes a film, having pores, and a plate member facing each other to define an ink storage space. The thermal printing unit includes a holding spool, holding an ink ribbon, a takeup spool, taking up the ink ribbon, and a ribbon passage leading the ink ribbon, unwound from the holding spool, to the takeup spool.

The ink transfer unit and the thermal printing unit are selectively mountable on the thermal printer, such that the film faces the recording sheet passage and the plate member faces the thermal head when the ink transfer unit is mounted, and the ribbon passage is positioned between the recording sheet passage and the thermal head when the thermal printing unit is mounted.

Preferably, the thermal printer comprises a printer housing and a cover rotatably attached to the printer housing. The platen roller is rotatably supported by the cover. The ink transfer unit and the thermal printing unit are mountable when the cover is open. The printer housing may be provided with a holding member by which the ink transfer unit and the thermal printing unit can be supported.

The thermal printing unit may comprise a first frame that supports the holding spool, a second frame that supports the takeup spool, and an intermediate frame that connects the first and second frames. The intermediate frame has an opening through which both surfaces of the ink ribbon are exposed.

The thermal printing unit may comprise a moving mechanism by which the takeup spool is rotated. Preferably, the thermal printer comprises a drive mechanism by which the platen roller is rotated. In this construction, the moving mechanism may be connected to the driving mechanism when the thermal printing unit is mounted on the thermal printer.

Preferably, the ink ribbon contains a plurality of color ink ribbon portions, each of the plurality of color ink ribbon portions containing differing color ink and being disposed with a predetermined pitch in the longitudinal direction of the ink ribbon. The recording sheet and one of the plurality of color ink ribbon portions are superposed on each other and moved downstream by the pitch so that an image of a first color corresponding to the one of the plurality of color ink ribbon portions is formed. Only the recording sheet is moved upstream by the predetermined pitch, and then the recording sheet and another one of the plurality of color ink ribbon portions are superposed on each other and moved downstream by the pitch so that an image of a second color corresponding to the other one of the plurality of color ink ribbon portions is formed. Thus an image containing the first and second colors is formed. The plurality of color ink ribbon portions may comprise at least three color of ink, so that a full color image is formable.

Preferably, the printer system further comprises a sensor that senses the thermal printing unit and the ink transfer unit when mounted on the thermal printer, and a heating unit that heats the thermal head based on a sensing result obtained by the sensor.

Furthermore, according to the present invention, there is provided a printer system comprising a thermal printer and an ink transfer unit. The thermal printer includes a thermal head and a platen roller facing each other to define a recording sheet passage therebetween. The ink transfer unit includes a film, having pores, and a plate member facing each other to define an ink storage space. The ink transfer unit is detachably mountable on the thermal printer.

The recording sheet is heated and pressed between the thermal head and the platen roller to form an image when the ink transfer unit is not mounted. The film faces the recording sheet passage and the plate member faces the thermal head so that the ink, stored in the ink storage space, is transferred through the pores due to heating by the thermal head to form an image when the ink transfer unit is mounted.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
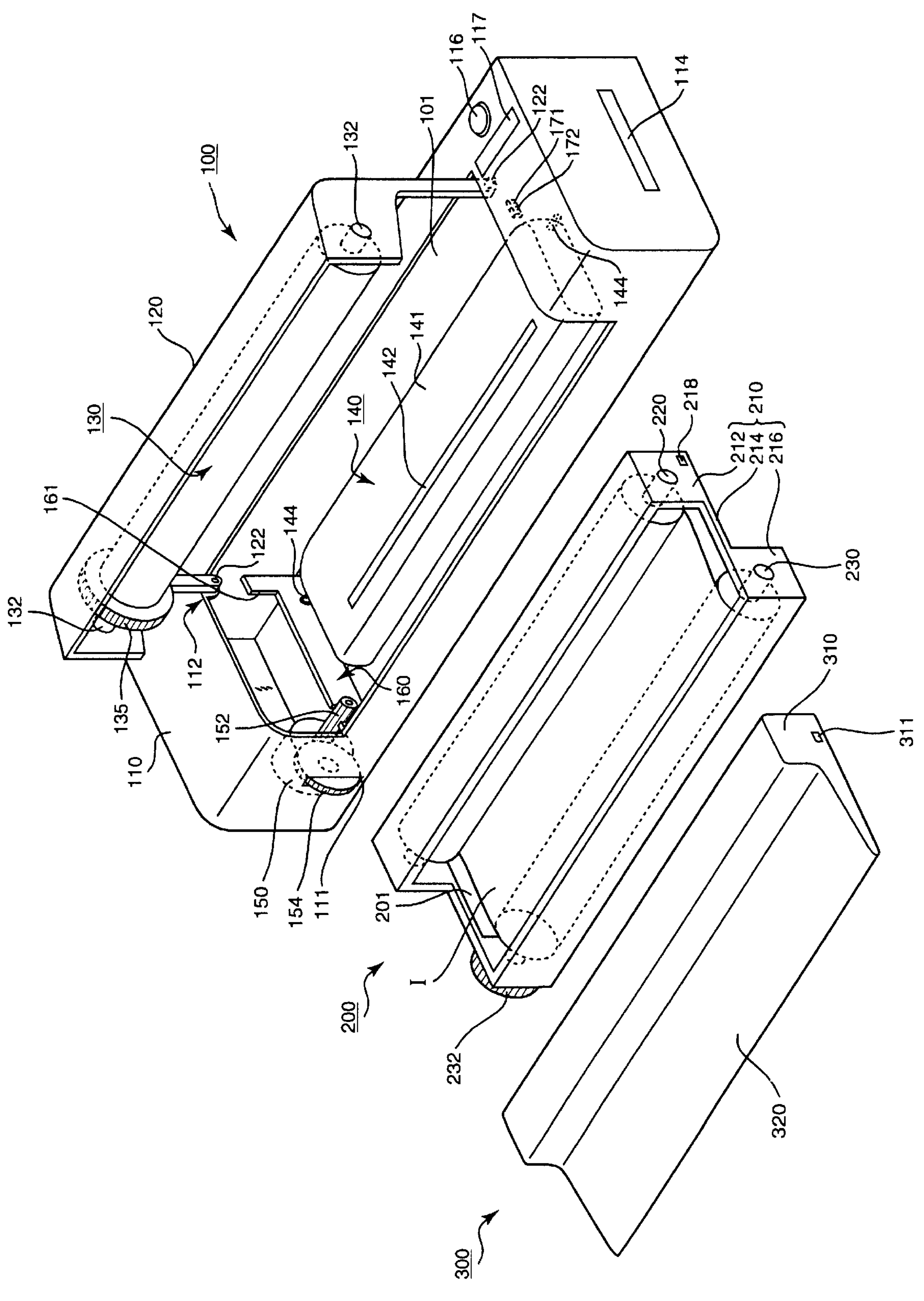
FIG. 1 is a perspective view showing a thermal printer of an embodiment of the present invention, with a detached, selectively-mountable thermal printing unit and a detached, selectively-mountable ink transfer unit.

FIG. 1 is a perspective view showing a thermal printer 100, a thermal printing unit 200 and an ink transfer unit 300.

The units 200 and 300 can be selectively mounted on the thermal printer 100.

The thermal printer 100 has a printer housing 110 and a cover 120. The printer housing 110 is rectangular parallelepiped or box-shaped and has an opening 101, which extends in the longitudinal direction of the printer housing 110. The cover 120 has a pair of support shafts 122 at end portions thereof. The support shafts 122 are inserted in respective bearing portions 112, which are formed on the printer housing 110, so that the cover 120 is rotatably supported by the printer housing 110.

A platen roller 130 extends in the longitudinal direction of the cover 120, and has a pair of support shafts 132 projecting from the end surfaces of the platen roller 130. The support shafts 132 are rotatably supported by side walls of the cover 120, so that the platen roller 130 can be rotated about the axis thereof. A platen gear 135 is fixed on one of the support shafts 132.

A drive motor 150 is housed in the printer housing 110. A motor gear 152 is fixed on an output shaft of the drive motor 150, and a tip of the motor gear 152 is positioned close to an edge of the opening 101. An intermediate gear 154 is rotatably mounted in the printer housing 110, and meshes with the motor gear 152. A part of the intermediate gear 154 projects outside the printer housing 110, through a window 111 formed in the housing 110.

When the cover 120 is closed, the platen gear 135 meshes with the motor gear 152. Therefore, if the drive motor 150 is driven, the motor gear 152 and the platen gear 135 are rotated, and thus the platen roller 130 is rotated.

A thermal head 140 is provided in the printer housing 110 and extended in parallel to the platen roller 130. The thermal head 140 has a slender support board 141 and a heating element 142 formed on the support board 141. Both end surfaces of the support board 141 are provided with a support shaft 144, which is rotatably supported by a respective holding frame 160. Both holding frames 160 are provided in the printer housing 110 and are positioned under the bearing portions 112, so that the thermal head 140 can pivot about the support shafts 144. Note that, in the drawing, only one of the holding frames 160 is indicated.

In the printer housing 110, a thermal printing unit 200 and an ink transfer unit 300 can be selectively mounted. First and second unit sensors 171 and 172 are provided in the printer housing 110 to detect whether the thermal printing unit 200 or the ink transfer unit 300 is mounted. The unit sensors 171 and 172 are reflective-type photo sensors, each of which has a light emitting diode radiating a beam, and a light receiving diode sensing the beam reflected by an object.

A main switch 116 is provided on an upper surface of the printer housing 110. When the main switch 116 is pressed once, electric power is supplied to the thermal head 140, the drive motor 150 and so on. Then, when the main switch 116 is pressed again, the supply of electric power is stopped. On the upper surface of the printer housing 110, an indicator 117 is provided to indicate an operational state of the thermal printer 100.

The thermal printing unit 200 has a frame 210, which is composed of a first frame 212, an intermediate frame 214 and a second frame 216. The first and second frames 212 and 216 are extended in parallel to each other, and are connected by the intermediate frame 214 in such manner that an opening 201 is formed. Each of the first and second frames 212 and 216 has the same length, which is marginally shorter than the opening 101, so that the thermal printing unit 200 can be mounted in the printer housing 110.

A holding spool 220 is rotatably supported by the first frame 212, and a takeup spool 230 is rotatably supported by the second frame 216. An ink ribbon I is wound around the holding spool 220 and the takeup spool 230. The ink ribbon I is wound in such a manner that an inner surface of the ink ribbon I, when wound on the holding spool 220 , becomes an outer surface when taken up by the takeup spool 230.

A lower end of the first frame 212 and an upper end of the second frame 216 are positioned at the same height, and the intermediate frame 214 is extended in a horizontal direction therebetween. A ribbon passage is defined by the intermediate frame 214, and upper and lower surfaces of the ink ribbon I are exposed through the opening 201.

End portions of the takeup spool 230 are projected from the second housing 216. A takeup gear 232 is fixed on one of the projected portions of the takeup spool 230, allowing the takeup gear 232 to mesh with the intermediate gear 154 when the thermal printing unit 200 is mounted.

A reflection plate 218 is provided on an end surface of the first frame 212.

The thermal printing unit 200 can be inserted into the printer housing 110 when the cover 120 is open. When mounted, the first frame 212 and the intermediate frame 214 are located in the printer housing 110, and the second frame 216 is disposed outside the printer housing 110. The intermediate frame 214 is placed on the holding frames 160, and rear surfaces of the first frame 212 contact vertical surfaces 161 of the holding frames 160, so that the takeup gear 232 securely meshes with the intermediate gear 154. Thus, when the drive motor 150 is driven, the takeup spool 230 is rotated through the motor gear 152, the intermediate gear 154 and the takeup gear 232.

In the state in which the thermal printing unit 200 is properly placed on the holding frames 160, the reflection plate 218 only faces the first unit sensor 171, so that the first unit sensor 171 outputs an ON-signal, and the second unit sensor 172 outputs an OFF-signal.

Further in this state, the intermediate frame 214 is placed outside of both end portions of the thermal head 140, and thus the bottom surface of the ink ribbon I can uniformly contact the heating element 142, and the top surface of the ink ribbon I can be in resilient contact with the platen roller 130.

On the other hand, the ink transfer unit 300 has a rectangular parallelepiped ink reservoir 310, in which a liquid ink is kept, and a flat beak portion 320, which is integrally connected to a bottom portion of the ink reservoir 310 and is extended in a horizontal direction.

The ink reservoir 310 is marginally shorter than the opening 101 so that the ink transfer unit 300 can be mounted in the printer housing 110. The ink transfer unit 300 can be inserted into the printer housing 110 when the cover 120 is open, and is placed on the holding frames 160. In this placing operation, a rear surface of the ink reservoir 310 contacts the vertical surfaces 161 of the holding frames 160, so that the ink transfer unit 300 is properly positioned in the printer housing 110.

A reflection plate 311 is provided on an end surface of the ink reservoir 310. When the ink transfer unit 300 is mounted in the printer housing 110, the reflection plate 311 only faces the second unit sensor 172, so that the second unit sensor 172 outputs an ON-signal, and the first unit sensor 171 outputs an OFF-signal.

Figure 2:
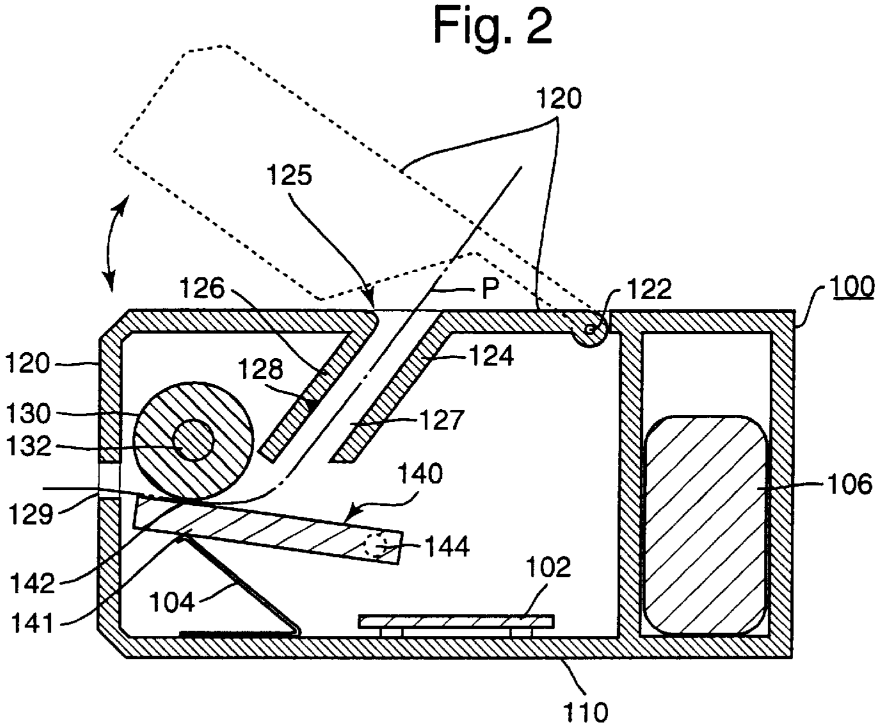
FIG. 2 is a side sectional view showing the thermal printer.

FIG. 2 is a side sectional view showing the thermal printer 100. In a state in which the cover 120 is closed, the platen roller 130 faces the heating element 142 of the thermal head 140. The support board 141 is urged by a leaf spring 104, disposed under the support board 141, to press the heating element 142 against the platen roller 130. Thus, a thermal recording sheet P is sandwiched between the platen roller 130 and the thermal head 140.

An inlet mouth 125 is formed in the cover 120 so that a recording sheet can be inserted into the printer housing 110. On the inside of the cover 120, guide walls 124, 126 are formed, so that a guide passage 127 connected to the inlet mouth 125 is defined. The guide walls 124, 126 are parallel to each other, and descend at a angle so that a recording sheet is guided to between the platen roller 130 and thermal head 140.

A recording sheet sensor 128 is attached to the guide wall 126. The recording sheet sensor 128 is a reflective-type photo sensor, which has a light emitting diode emitting a beam, and a light receiving diode sensing the beam reflected by the recording sheet P. Namely, the recording sheet sensor 128 outputs an ON-signal when sensing a recording sheet, and outputs an OFF-signal when not sensing a recording sheet, i.e. when a recording sheet is not inserted in the inlet mouth 125.

An outlet mouth 129 is formed in a front surface (a left side of the printer housing 110 in FIG. 2), and is positioned at substantially the same height as the portion of the thermal recording sheet P sandwiched between the platen roller 130 and the thermal head 140.

A battery 106 is provided in the printer housing 110, to supply electric power to the thermal head 140, the drive motor 150 and so on, when the main switch 116 is operated. A circuit board 102 is disposed in the printer housing 110, to control an operation of the thermal printer 100.

Figure 3:
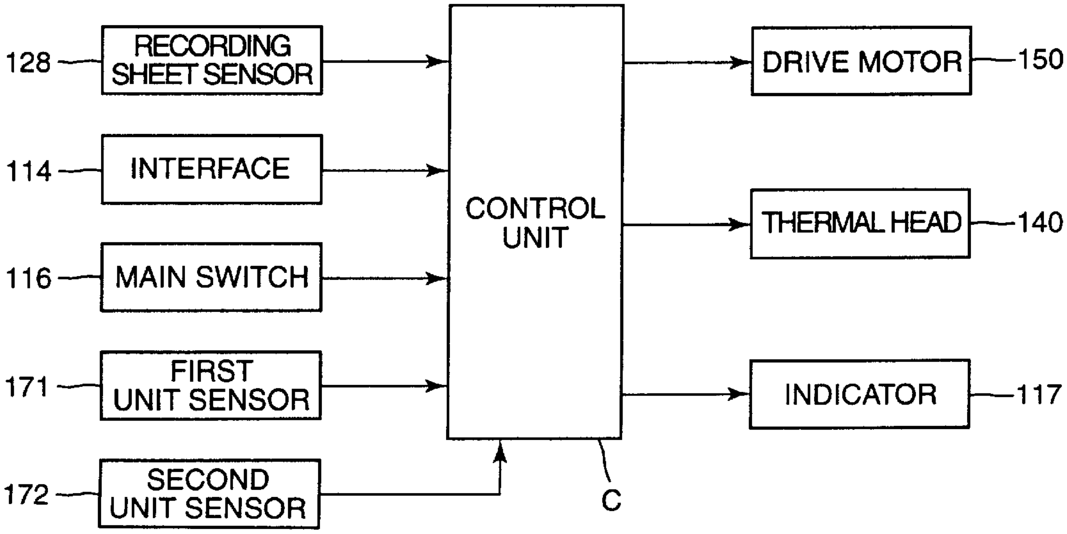
FIG. 3 is a block diagram showing a control system of the thermal printer.

FIG. 3 is a block diagram showing a control system of the thermal printer 100. A control unit C is provided on the circuit board 102. The thermal printer 100 can be connected to an external device (not shown) through an interface 114 (FIG. 1) provided on an outer surface of the printer housing 110, allowing image data to be inputted to the thermal printer from the external device.

The main switch 116 and the battery 106 are connected to the control unit C to supply electric power to the drive motor 150, thermal head 140, the indicator 117, the interface 114, the recording sheet sensor 128, and the unit sensors 171, 172. A signal, which is generated by the unit sensors 171, 172 and indicates what unit is mounted in the printer housing 110, and a signal, which is generated by the recording sheet sensor 128 and indicates whether a recording sheet is inserted or not, are inputted to the control unit C. The thermal head 140 and the drive motor 150 are controlled based on these input signals.

An operation, in which only the thermal printer 100 is used to form an image on the thermal recording sheet P, is described below. Namely, in this state, the thermal printing unit 200 and the ink transfer unit 300 are not mounted in the printer housing 110, so that each of the unit sensors 171, 172 outputs an OFF-signal. In accordance with the OFF-signals, the thermal printer 100 is controlled by the control unit C, so that an image is formed on the thermal recording sheet P using only the thermal printer 100. Note that the thermal recording sheet P is a recording sheet, by which a color is developed due to a specific localized heating.

A print start signal and image data are inputted from an external device connected to the interface 114. When the print start signal is inputted to the control unit C, it is determined in the control unit C whether the recording sheet sensor 128 is sensing the recording sheet P. If the recording sheet sensor 128 is not sensing the recording sheet P, it is deemed that the recording sheet P has not been inserted from the inlet mouth 125, and thus a message, for example, "NO RECORDING SHEET", is indicated on the indicator 117.

When the recording sheet sensor 128 senses the recording sheet P, it is deemed that the recording sheet P has been inserted in the inlet mouth 125 and the tip portion of the recording sheet P has reached a portion between the platen roller 140 and the thermal head 140. Consequently, controls for the drive motor 150 and the thermal head 140 are started, such that the drive motor 150 is rotated and the thermal head 140 is heated. The recording sheet P is pressed with a predetermined pressure between the thermal head 140 and the platen roller 130, and is fed downstream (leftward in FIG. 2) due to the rotation of the platen roller 130. Due to this operation, an image is formed on the recording sheet P due to the applied pressure and the heat. When the image has been formed or recorded on the recording sheet P, the recording sheet P is ejected from the outlet mouth 129.

Thus, with only the thermal printer 100, an image can be formed on the thermal recording sheet P. Note that, if the control unit C is constructed in such a manner that, when each the unit sensors 171, 172 outputs an OFF-signals, the thermal head 140 is controlled to heat for a thermal recording operation, a higher quality image can be recorded on the recording sheet.

Figure 4:
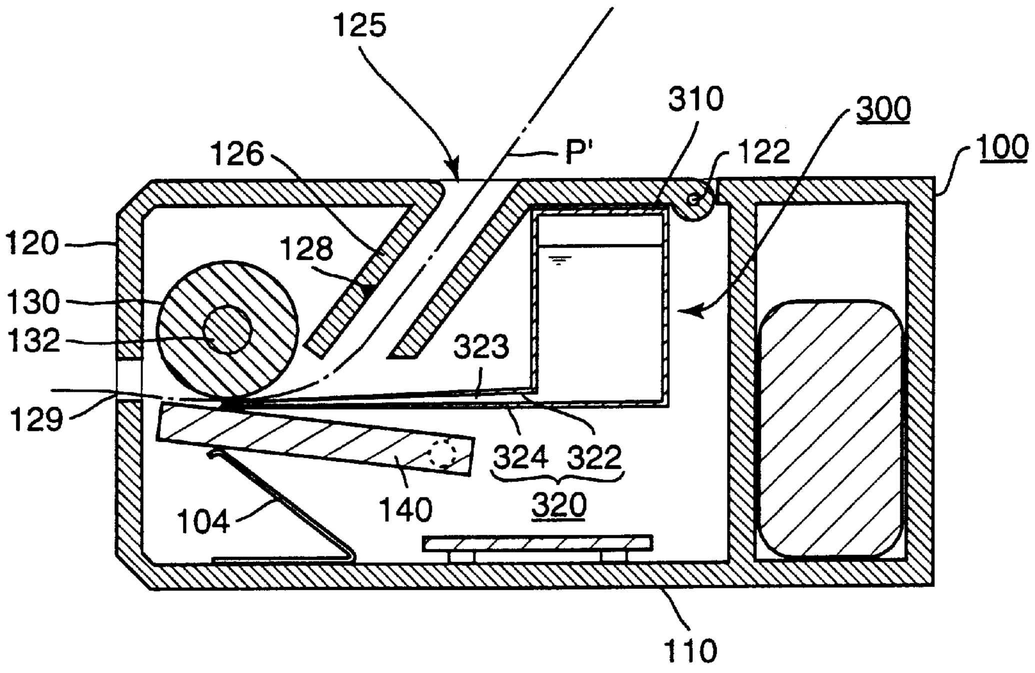
FIG. 4 is a side sectional view showing a state in which the ink transfer unit is mounted on the thermal printer.

FIG. 4 is a side sectional view showing a state in which the ink transfer unit 300 is mounted in the thermal printer 100. In this state, the first unit sensor 171 outputs an OFF-signal and the second unit sensor 172 outputs an ON-signal. In accordance with these signals, the thermal printer 100 is controlled by the control unit C, so that an image is formed on the recording sheet P, using the ink transfer unit 300.

The flat beak portion 320 is constructed by superposing a film 322 onto a bottom plate 324, which is made of a stainless steel, to form an ink space 323 therebetween to hold the liquid ink. The ink space 323 is communicated with the ink reservoir 310 to pass the liquid ink therebetween. Note that the thickness of the bottom plate 324 is 0.01–0.02 mm, enabling the flat beak portion 320 to deform to some extent.

When the ink transfer unit 300 is mounted in the thermal printer 100 and the cover 120 is closed, a tip portion of the flat beak portion 320 is sandwiched between the platen roller 130 and the thermal head 140. In this state, the bottom plate 324 is in contact with the thermal head 140, and the film 322 contacts the platen roller 130. A recording sheet P' inserted in the inlet mouth 125, is supplied to between the platen roller 130 and the film 322.

Figure 5:
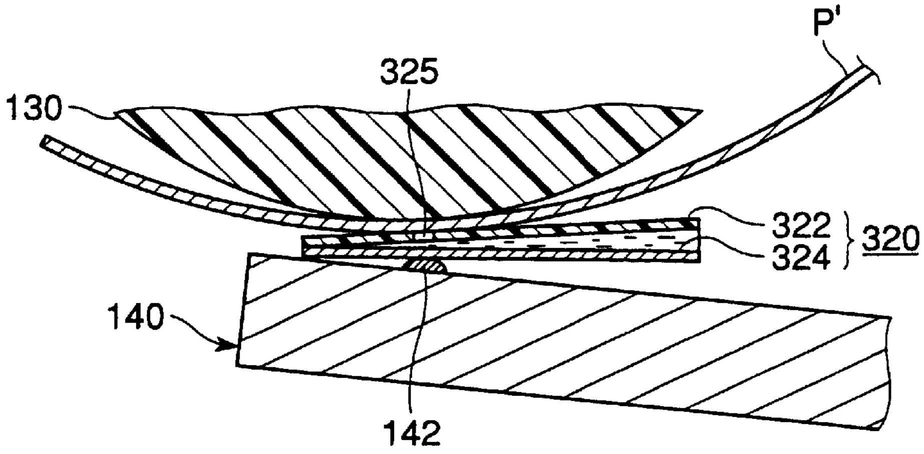
FIGS. 5 and 6 are schematic views showing a principle by which an image is formed using the ink transfer unit.
Figure 6:
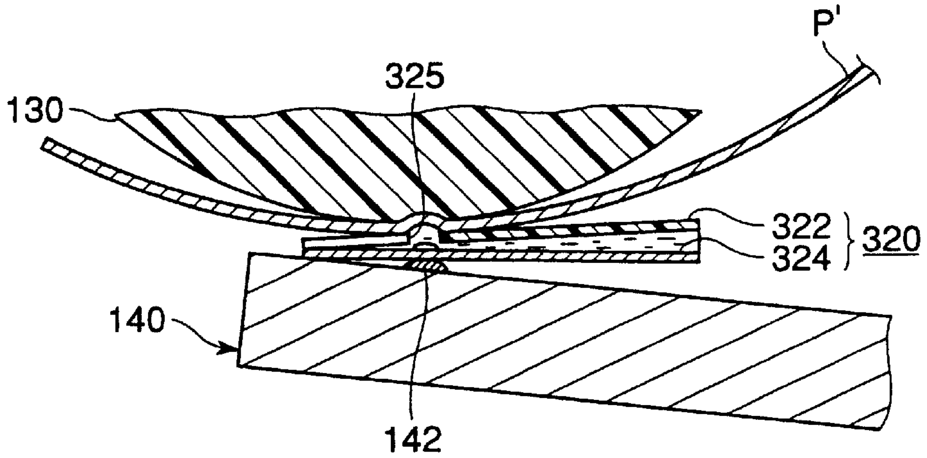

FIGS. 5 and 6 are schematic views showing a principle by which an image is formed using the ink transfer unit 300. As shown in FIG. 5, a hole 325 is formed in the film 322 at a position corresponding to the heating element 142 of the thermal head 140. The inner diameter of the hole 325 is such that ink cannot pass therethrough in a non-operating state as shown in FIG. 5. Conversely, when the heating element 142 of the thermal head 140 is heated, ink, positioned in the vicinity of the portion above the heating element 142, is heated through the bottom plate 324. Due to this heat, as shown in FIG. 6, the locally heated ink vaporizes, increasing the pressure of the ink on the film 322. At the same time, the elasticity of the film 322 is locally decreased due to the heat, so that the film 322 becomes relatively deformable.

Thus, the ink is urged into and expands the hole 325 formed in the film 322. Then, the ink passes through the hole 325, and is transferred onto the recording sheet P', which is in tight contact with the upper surface of the film 322. After this transfer, the heating of the heating element 142 is stopped, and thus, the ink and the film 322, which have been locally heated, are cooled by the surrounding ink, so that the size of the hole 325 returns to the original size, which is small enough to block the ink. Thus, in accordance with predetermined print data, the heating of the heating element 142 is controlled and the platen roller 130 is rotated to feed the recording sheet P', so that an image is formed by the ink on the recording sheet P'.

As described above, by attaching the ink transfer unit 300 to the thermal printer 100, the ink transfer can be performed to the recording sheet P', similarly to the printing operation in which only the thermal printer 100 is used for printing an image on the thermal recording sheet P.

Note that, if the thermal printer 100 is constructed in such a manner that, when the first unit sensor 171 outputs an OFF-signal and the second unit sensor 172 outputs an ON-signal, the thermal head 140 is controlled by the control circuit C to heat for an ink transfer operation, a higher quality image can be recorded on the recording sheet.

Figure 7:
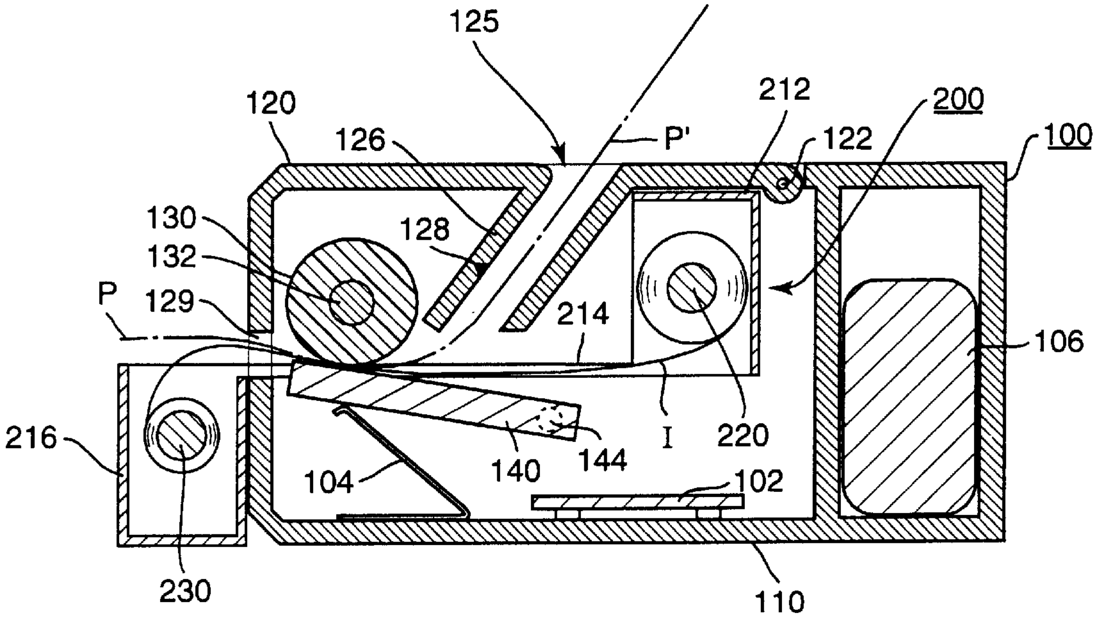
FIG. 7 is a side sectional view showing a state in which the thermal printing unit is mounted on the thermal printer.

FIG. 7 is a side sectional view showing a state in which the thermal printing unit 200 is mounted in the thermal printer 100. In this state, the first unit sensor 171 outputs an ON-signal and the second unit sensor 172 outputs an OFF-signal. In accordance with these signals, the thermal printer 100 is controlled by the control unit C, so that an image is formed on the recording sheet P' using the thermal printing unit 200.

The ink ribbon I, which is held on the holding spool 220 and which is taken up by the takeup spool 230, is in slidable contact with the thermal head 140, and passes under the recording sheet P' inserted from the inlet mouth 125.

Figure 8:
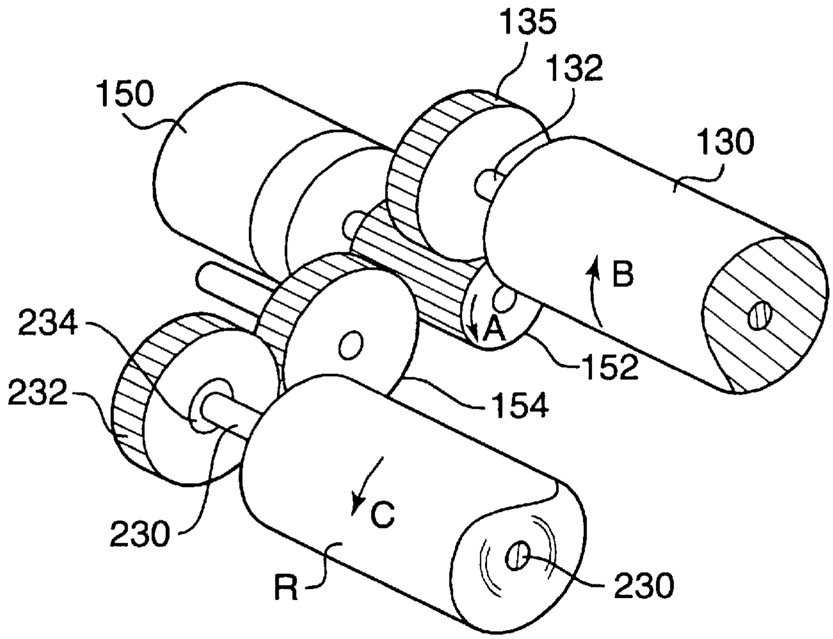
FIG. 8 is a perspective view showing a drive system for a platen roller and a takeup spool.

When the thermal printing unit 200 is correctly placed on the holding frames 160, and the cover 120 is closed, the platen gear 135 meshes with the motor gear 152, as shown in FIG. 8. Further, the motor gear 152 meshes with the intermediate gear 154, which in turn meshes with the takeup gear 232. Therefore, by driving the drive motor 150, each of the motor gear 152, the platen roller 130 and the takeup spool 230 is rotated in the direction shown by the arrows A, B and C, respectively.

The drive motor 150 can be rotated in a downstream direction (shown by the arrow A in the drawing) and an upstream direction. When the drive motor 150 is rotated in the downstream direction, each of the platen roller 130 and the takeup spool 230 is rotated in the directions shown by the arrows B and C, respectively. On the other hand, a one-way clutch 234 is provided between the takeup gear 232 and the takeup spool 230. Therefore, when the drive motor 150 is rotated in the upstream direction, although the platen roller 130 is rotated in the upstream direction, the takeup spool 230 is not rotated.

When using the thermal printing unit 200, the printing operation selected depends upon whether a monochromatic ink ribbon is used or a multicolored ink ribbon is used.

A case, in which the monochromatic ink ribbon is used, is described below. When a print start signal is inputted to the control unit C from an external device, due to the control of the control unit C, the platen roller 130 and the takeup spool 230 are rotated by the drive motor 150, and the heating element 142 of the thermal head 140 is heated. The recording sheet P' and the ink ribbon I are pressed with a predetermined pressure between the thermal head 140 and the platen roller 130, and are moved downstream (leftward in FIG. 7) due to the rotation of the platen roller 130.

The ink ribbon I is heated by the thermal head, so that ink contained in the ink ribbon I is melted by the heat, and is transferred onto a bottom surface of the recording sheet P'. The ink ribbon I is taken up by the takeup spool 230, and the recording sheet P' is ejected from the thermal printer 100, through the outlet mouth 129. Thus, when a monochromatic ink ribbon is used, an image is recorded on the recording sheet P' in a printing operation similar to the that in which only the thermal printer 100 is used for printing an image on the thermal recording sheet P.

Note that, if the thermal printer 100 is constructed in such a manner that, when the first unit sensor 171 outputs an ON-signal and the second unit sensor 172 outputs an OFF-signal, the thermal head 140 is controlled by the control circuit C, to heat for a thermal printing operation, a higher quality image can be recorded on the recording sheet P'.

Figure 9:
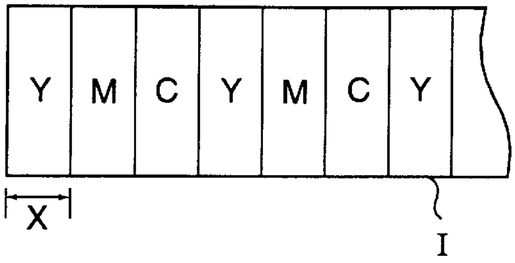
FIG. 9 is a plan view showing a multiple-color ink ribbon.

A case, in which the multicolored ink ribbon is used, is described below. As shown by FIG. 9, the multicolored ink ribbon I is constructed in such a manner that yellow (Y), magenta (M) and cyan (C) ink areas are formed alternately at a predetermined pitch X. Note that a black ink area may be added to the multicolored ink ribbon I.

Figure 10:
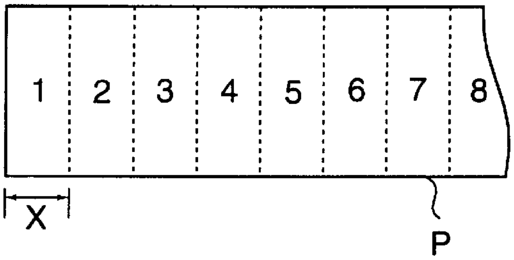
FIG. 10 is a plan view showing a recording sheet.

In the case of the thermal printing unit 200 using the multicolored ink ribbon I, a reflection plate (not shown) is disposed on the side surface of the first frame 212 such that the reflection plate is sensed by the first and second unit sensors 171, 172. In this case, each of the first and second unit sensors 171, 172 outputs an ON-signal, so that an operation different from the usual printing operation is performed by the control unit C. Namely, the recording sheet P' is divided into a plurality of sections 1, 2, 3, 4, 5, . . . each of which has the same pitch X as the multicolored ink ribbon I, as shown in FIG. 10, and while the ink ribbon I is moved in the downstream direction, each of the sections of the recording sheet P' is moved repeatedly downstream and upstream by the number of the colors, so that a color image is formed on the recording sheet P'.

Figure 11:
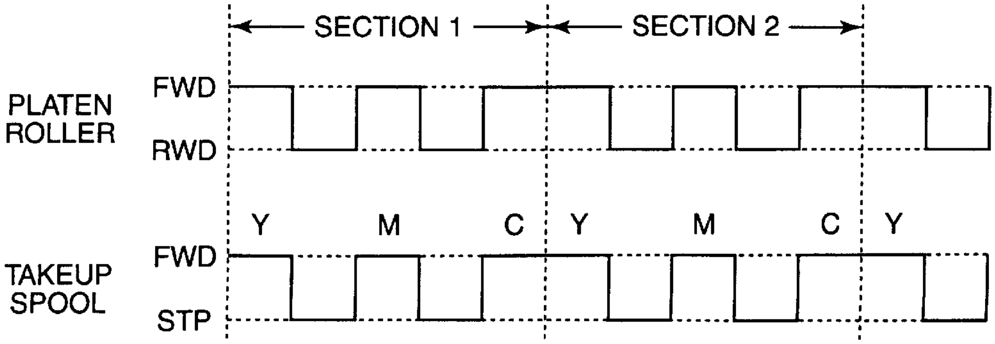
FIG. 11 is a timing chart showing an operation in which a full color image is formed.

FIG. 11 is a timing chart showing an operation of the platen roller 130 and the takeup spool 230. When the control unit C receives a print start signal from an external device, the drive motor 150 and the thermal head 140 are driven by the control unit C. Namely, the drive motor 150 feeds the recording sheet P' and the ink ribbon I is moved by the pitch X, so that a yellow image is formed on section 1 of the recording sheet P'.

After the yellow image is formed on section 1, the drive motor 150 is reversed by the control unit C, so that the recording sheet P' is pulled back upstream by the pitch X. At that time, the takeup spool 230 is not rotated due to the one way clutch 234 in FIG. 8, and therefore, the ink ribbon I is not pulled back. Thus, the recording sheet P' retreats upstream until the front edge of section 1 coincides with the front edge of the magenta ink area. Then, the drive motor 150 is rotated forward again, and a magenta image is formed on section 1 of the downstream-moving recording sheet P'.

In the same way as above, a cyan image is formed on section 1. Thus, a full color image composed of yellow, magenta and cyan images is formed on the recording sheet P'. Note that, after the cyan image is formed on section 1, the forward rotation of the drive motor 150 is continued, allowing the above process to be repeated for forming a full color image on section 2 of the recording sheet P'.

As described above, when the thermal printing unit 200 is mounted in the thermal printer 100, a monochromatic image and a multicolored image can be formed. Note that, if the heating element 142 is controlled in accordance with a full color thermal printing operation, a higher quality image can be formed.

According to the embodiment of the present invention, by using only the thermal printer 100, an image can be formed on the thermal recording sheet P, and when the ink transfer unit 300 is mounted in the thermal printer 100, liquid ink can be transferred onto the recording sheet P'. Further, when the thermal printing unit 200 is mounted in the thermal printer 100, the ink ribbon is heated so that ink contained in the ink ribbon is melted and also transferred onto the recording sheet P'.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 9-304989 (filed on Oct. 20, 1997) which is expressly incorporated herein, by reference, in its entirety.

What is claimed is:

1. A printer system comprising:

a thermal printer that includes a thermal head and a platen roller facing each other to define a recording sheet passage therebetween;

an ink transfer unit that includes a film, having pores, and a plate member facing each other to define an ink storage space; and a thermal printing unit that includes a holding spool, holding an ink ribbon, a takeup spool, taking up said ink ribbon, and a ribbon passage leading said ink ribbon, unwound from said holding spool, to said takeup spool;

said ink transfer unit and said thermal printing unit being selectively mountable on said thermal printer, such that said film faces said recording sheet passage and said plate member faces said thermal head when said ink transfer unit is mounted, and said ribbon passage is positioned between said recording sheet passage and said thermal head when said thermal printing unit is mounted.

2. A printer system according to claim 1, wherein, when said ink transfer unit and said thermal printing unit are detached from said thermal printer, said recording sheet is heated and pressed between said thermal head and said platen roller, so that an image is formed on said recording sheet.

3. A printer system according to claim 1, wherein said thermal printer comprises a printer housing and a cover rotatably attached to said printer housing, said platen roller being rotatable supported by said cover, and said ink transfer unit and said thermal printing unit being mountable when said cover is open.

4. A printer system according to claim 3, wherein said printer housing is provided with a holding member by which said ink transfer unit and said thermal printing unit can be supported.

5. A printer system according to claim 1, wherein said thermal printing unit comprises a first frame that supports said holding spool, a second frame that supports said takeup spool, and an intermediate frame that connects said first and second frames, said intermediate frame having an opening through which both surfaces of said ink ribbon are exposed.

6. A printer system according to claim 1, wherein said thermal printing unit comprises a moving mechanism by which said takeup spool is rotated.

7. A printer system according to claim 6, wherein said thermal printer comprises a drive mechanism by which said platen roller is rotated, said moving mechanism being connected to said driving mechanism when said thermal printing unit is mounted on said thermal printer.

8. A printer system according to claim 1, wherein said ink ribbon contains a plurality of color ink ribbon portions, each of said plurality of color ink ribbon portions containing differing color ink and being disposed with a predetermined pitch in the longitudinal direction of said ink ribbon, said recording sheet and one of said plurality of color ink ribbon portions being superposed on each other and moved downstream by said pitch so that an image of a first color corresponding to said one of said plurality of color ink ribbon portions is formed, only said recording sheet being moved upstream by said predetermined pitch, and said recording sheet and another one of said plurality of color ink ribbon portions being superposed on each other and moved downstream by said predetermined pitch so that an image of a second color corresponding to the other one of said plurality of color ink ribbon portions is formed, such that an image containing said first and second colors is formed.

9. A printer system according to claim 8, wherein said plurality of color ink ribbon portions comprises at least three colors of ink, so that a full color image is formable.

10. A printer system according to claim 1, further comprising a sensor that senses said thermal printing unit and said ink transfer unit when mounted on said thermal printer, and a heating unit that heats said thermal head based on a sensing result obtained by said sensor.

11. A printer system comprising:

a thermal printer that includes a thermal head and a platen roller facing each other to define a recording sheet passage therebetween; and an ink transfer unit that includes a film, having pores, and a plate member facing each other to define an ink storage space, said ink transfer unit being detachably mountable on said thermal printer;

a recording sheet being heated and pressed between said thermal head and said platen roller to form an image when said ink transfer unit is not mounted, and, when said ink transfer unit is mounted, said film facing said recording sheet passage and said plate member facing said thermal head so that said ink, stored in said ink storage space, is transferred through said pores due to heating by said thermal head to form an image.

* * * * *